United States Patent [19]

Murayama

[11] Patent Number: 4,860,549
[45] Date of Patent: Aug. 29, 1989

[54] VARIABLE DISPLACEMENT WOBBLE PLATE TYPE COMPRESSOR

[75] Inventor: Koji Murayama, Tokyo, Japan

[73] Assignee: Nihon Radiator Co., Ltd., Tokyo, Japan

[21] Appl. No.: 133,645

[22] Filed: Dec. 16, 1987

[30] Foreign Application Priority Data

Dec. 16, 1986 [JP] Japan .................................. 61-297500

[51] Int. Cl.$^4$ ................................................ F25B 1/00
[52] U.S. Cl. ........................................ 62/115; 62/215; 62/228.3
[58] Field of Search ...................... 62/228.3, 226, 215, 62/200, 228.5, 229, 115; 417/270

[56] References Cited

U.S. PATENT DOCUMENTS

| | | | |
|---|---|---|---|
| 4,428,718 | 1/1984 | Skinner | 417/222 |
| 4,526,516 | 7/1985 | Swain et al. | 417/222 |
| 4,582,124 | 4/1986 | Yoshimi et al. | 62/228.5 |
| 4,586,874 | 5/1986 | Hiraga et al. | 417/270 |
| 4,606,705 | 8/1986 | Parekh | 417/270 X |

FOREIGN PATENT DOCUMENTS

| | | |
|---|---|---|
| 574023 | 7/1985 | Australia . |
| 573308 | 8/1985 | Australia . |
| 61-46014 | 12/1986 | Japan . |
| 61-46015 | 12/1986 | Japan . |
| 61-46016 | 12/1986 | Japan . |
| 61-46017 | 12/1986 | Japan . |

*Primary Examiner*—William E. Wayner
*Attorney, Agent, or Firm*—Foley & Lardner, Schwartz, Jeffery, Schwaab, Mack, Blumenthal & Evans

[57] ABSTRACT

The discharge of a variable displacement wobble plate compressor is varied by selectively controlling the pressure prevailing in the crankcase of the device. The duty cycle of a signal controlling the pressure is determined in accordance with the ambient air temperature, the temperature required in the cabin and pressure prevailing in the evaporator.

8 Claims, 4 Drawing Sheets

VARIABLE DISPLACEMENT WOBBLE PLATE TYPE COMPRESSOR

BACKGROUND OF THE INVENTION

1. Field of the Invention

The present invention relates generally to wobble plate compressors and more specifically to a wobble plate compressor which is adapted for use in an automotive air conditioner refrigeration system and which features a control arrangement which improves the performance characteristics of the same.

2. Description of the Prior Art

In automotive air conditionining units and the like, the refrigeration unit forming an essential part thereof, includes an arrangement wherein the high temperature/pressure gas which is discharged from the compressor, is cooled and liquified by heat exchange with the ambient atmosphere. Following this the liquid refrigerant or working fluid is fed into an evaporator in the form of a mist after being reduced in pressure by an expansion valve. Heat from the air being "conditioned" is absorbed by the mist which is subsequently converted into its gaseous state. However, in automotive applications, the compressor is subject to frequent change due to the corresponding change in rotational speed of the engine (ICE) by which it is driven. This varies the thermal load applied to the evaporator.

In order to compensate for this rotational speed and thermal load variation the refrigerant valve is commonly used to control the amount of refigerant that is flowing into the evaporator to a level appropriate for the instant set of operating conditions. Viz., as there is a given relationship between the evaporative temperature and the evaporative pressure in the evaporator, by controlling the amount of liquid refrigerant which enters the evaporator the temperature thereof can also be controlled. Accordingly, it is possible to control the temperature of the evaporator with respect to the thermal load on the system.

In order to prevent the water which condenses on the evaporator from freezing it is known to use a thermoswitch which is responsive to the surface temperature of the evaporator and which stops the operation of the compressor in the event that the surface temperature lowers excessively.

However, it is often the case that the air conditioning system is used in spring, winter and autumn to dehumidify the air within the vehicle cabin and prevent fogging of the windows and the like. Under these conditions the thermal load on the system is lower than in summer due to the inherently lower ambient air temperature and the compressor is subject to frequent ON/OFF operation.

Further, in the case of a non-variable type compressor the amount of refrigerant discharged by the same does not change with thermal load and thus consumes the same amount of power even when the thermal load is low.

To obviate this inefficient operation it has been proposed to use a variable displacement wobble plate compressor of the nature disclosed in JP-A-58-158352 (which corresponds to United States Patent No. 4,428,718 issued on Jan. 31, 1984 in the name of skinner). In this arrangement the displacement of the compressor is varied in accordance with the induction pressure. This allows the amount of refrigerant which flows through the system to be controlled with respect to the thermal load on the evaporator while maintaining the induction pressure constant.

With this arrangement the undesired phenomenon wherein, due to over throttling by the expansion valve, the evaporative pressure is excessively lowered, is avoided. This obviates the freezing of condensed water on the evaporator and obviates the need to provide a thermoswitch.

However, this arrangement has suffered from the drawback that as the compressor output is controlled with respect to its induction pressure and in a manner which prevents the freezing of the condensed water on the evaporator surface, it is not possible to vary the temperature of the evaporator. By way of example, the above mentioned wobble plate arrangement is so controlled that the induction pressure assumes a value of about 2.1 $Kg/cm^2$. Accordingly, as the induction port of the compressor is connected to the evaporator, the temperature of the latter varies with the evaporative pressure whereby the water condensed on the surface of the evaporator is prevented from freezing. During the summer, even when the temperature of the evaporator is set below 0° C., the higher ambient air temperatures prevent the freezing of the condensed water. However, when the ambient air temperature lowers such as during winter, the set induction pressure of 2.1 $Kg/cm^2$ requires the operation of the compressor to be frequently stopped as the difference between the desired and ambient air temperatures is small.

SUMMARY OF THE INVENTION

It is an object of the present invention to provide a variable displacement compressor arrangement which can obviate frequent ON/OFF operation and prevent the freezing of the water condensed on the surface of the evaporator under low thermal load conditions, and which ensures that, during summer and the like hot weather when the thermal load is high and the ambient temperature is high, the temperature of the evaporator can be lowered to a suitably low level.

In brief, the above object is achieved by an arrangement wherein the discharge of a variable displacement wobble plate compressor is varied by selectively controlling the pressure prevailing in the crankcase of the device. The duty cycle of a signal controlling the pressure is determined in accordance with the ambient air temperature, the temperature required in the cabin and pressure prevailing in the evaporator.

More specifically, a first aspect of the present invention comes in the form of a system featuring a variable displacement wobble plate compressor, the compressor having a crankcase, the compressor being so constructed and arranged that the displacement of the compressor is controlled by the pressure in the crankcase; a valve for controlling the pressure in said crankcase; sensor arrangement; and a control circuit responsive to the sensor arrangement for controlling the operation of the valve in a manner to selectively vary the pressure prevailing in the crankcase.

A second aspect of the present invention takes the form of a refrigeration system which features an evaporator; a variable displacement wobble plate compressor, the compressor having a crankcase, the compressor being so constructed and arranged that the displacement of the compressor is controlled by the pressure in the crankcase, the compressor having an induction port in fluid communication with the evaporator; a valve for controlling the pressure in the crankcase; a sensor arrangement for determining the ambient air temperature and the temperature to which the evaporator is required to be controlled; a pressure sensor responsive to the pressure prevailing in the evaporator; and a control circuit responsive to the sensor arrangement and the pressure sensor for controlling the operation of the valve in a manner which selectively varies the pressure prevailing in the crankcase.

A third aspect of the invention comes in the form of a method of operating a refrigeration system comprising: an evaporator; a variable displacement wobble plate compressor, the compressor having a crankcase, the compressor being so constructed and arranged that the displacement of the compressor is controlled by the pressure in the crankcase, the compressor having an induction port in fluid communication with the evaporator; and a valve for controlling the pressure in the crankcase; the method being characterized by the steps of: sensing the ambient air temperature and the temperature to which the evaporator is required to be controlled; sensing the pressure prevailing in the evaporator; and controlling the operation of the valve in response to the sensed ambient air temperature, the temperature to which the evaporator is to be controlled and the pressure prevailing in the evaporator.

DETAILED DESCRIPTION OF THE PREFERRED EMBODIMENTS

Figure 1:
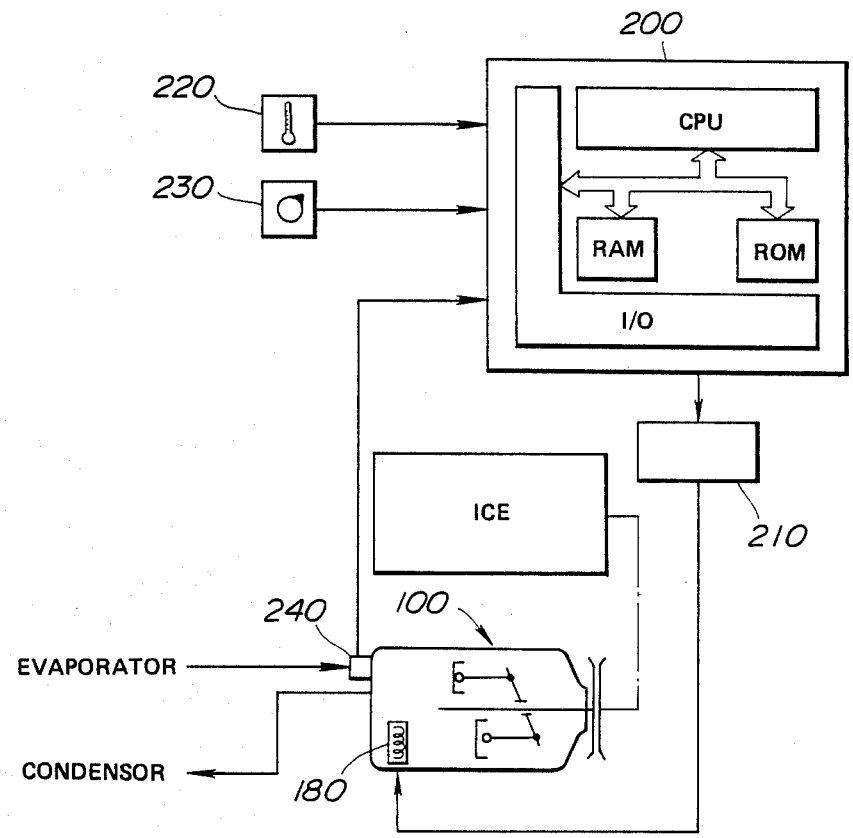
FIG. 1 shows in schematic form the basic arrangement of the present invention.

FIG. 1 schematically illustrates the present invention. As will be appreciated from this figure, the invention features a variable displacement wobble plate compressor 100 which is equipped with an electromagnetic or solenoid type valve 180 for controlling the displacement thereof. The valve 180 is operatively connected to a microprocessor 200 through a signal generator 210. The microprocessor 200 is, as shown, connected with an ambient temperature sensor 220, a required temperature sensor 230 and a pressure sensor 240 which, in the illustrated embodiment is disposed in the induction port of the compressor 100. Although not shown it will be appreciated that in the case the outputs of the sensors are analog they will be subject to A/D conversion prior to the values thereof being record in RAM.

In brief, the illustrated arrangement is such that the output of the compressor 100 is controlled by the pressure prevailing in the crankcase of the device (a detailed explantion of this control will be made hereinlater). In order to control the pressure, the duty cycle of the solenoid control signal produced by the signal generator 210 is selectively varied. To determine the appropriate duty cycle the required temperature and the ambient temperature are sensed and a target evaporator pressure determined. The target value is suitably corrected with respect to the temperature to which it is desired to control the air and to ensure that even when the temperature of the evaporator is caused to fall below 0° C. still freezing of the water condensed on the outer surface of the same will not occur. The corrected value is then compared with the actual pressure prevailing in the evaporator (sampled at the induction port of the compressor) and the difference used to determine the change in the duty cycle which is necessary to bring about the required operation.

However, before describing the above control in detail, it is deemed appropriate to firstly consider the construction and arrangement of the compressor per se.

Figure 2:
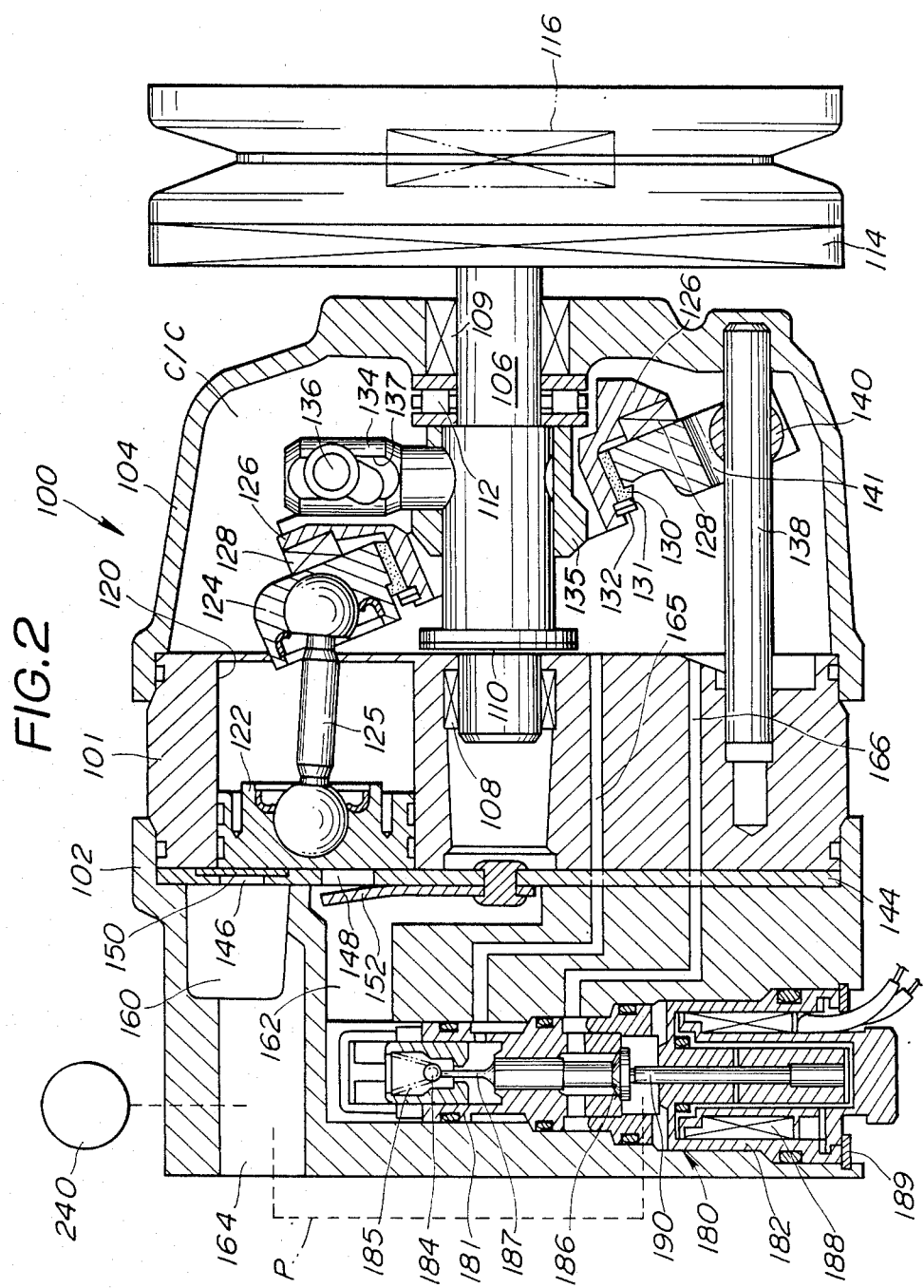
FIG. 2 is a sectional elevation of a variable displacement wobble plate type compressor equipped with a solenoid or electromagnetic valve according to an embodiment of the present invention.

FIG. 2 shows in sectional elevation, the detailed construction of the wobble plate compressor depicted in FIG. 1. As will be appreciated, this arrangement includes a cylinder block 101 having a cylinder head 102 and a crankcase cover 104 sealingly secured to opposite ends thereof. The crankcase cover 104 defines an enclosed space or what shall be referred to as a crankcase chamber C/C, between it and the cylinder block 101.

A drive shaft 106 is supported centrally in the compressor at the cylinder block 101 and the crankcase cover 104 by radial needle bearings 108, 109 respectively. The drive shaft 106 is further axially retained by a thrust washer 110 which is disposed inward of the radial bearing 108 and a thrust needle bearing 112 located inboard of the radial bearing 109.

The drive shaft 106 extends through the crankcase cover 104 for connection to prime mover such as an automotive engine (ICE) or the like (shown schematically in FIG. 1) by way of a pulley 114 which is selectively connectable to the drive shaft via an electromagnetic clutch 116.

The cylinder block 101 has five (merely by way of example) axially arranged parallel cylinder bores 120 (only one shown) which are equally spaced from the axis of the drive shaft 106 and arranged equidistantly thereabout. In this arrangement the cylinder bores 120 each receive a reciprocal piston 122 which includes seals, received in annular grooves formed about the periphery thereof. Each of the pistons 122 is connected to an annular non-rotary wobble plate 124 via a piston rod 125.

Each of the piston rods 125 is connected to its respective piston 122 by way of a universal joint. In this arrangement the joints are defined by a spherical rod end which is retained in a socket formed in the backside of the piston by a retainer which is swagged in place. The other end of each of the piston rods 125 is connected to the wobble plate 124 via a similarly constructed universal joint.

The wobble plate 124 is disposed coaxially about the drive shaft 106 and mounted on a rotary drive plate 126. The wobble plate 124 is supported on this drive plate 126 by a thrust bearing 128 and a radial bearing 130 and retained in place by a thrust washer 131 and a snap ring 132.

The drive plate 126 is operatively connected to the drive shaft 106 via a lug 134 which extends from the drive shaft 106 and protrudes through an axial slot formed in a sleeve member 135. The connection between the drive plate 126 and the lug 134 is achieved by a pin 136 which is received in an angled slot 137. This arrangement permits the drive and wobble plates 126, 124 to undergo changes in inclination within the crankcase in a manner which permits the length of the piston strokes to change as will become more apparent hereinlater.

In order to prevent the wobble plate 124 from rotating with the drive plate 126 in the crankcase, the lower end thereof (as seen in the drawings) is operatively connected to a guide pin 138 which is press fitted into bores formed in the cylinder block 101 and the crankcase cover 104. Connection between the guide pin 138 and the wobble plate 124 is established by a ball guide 140 which is slidably received on the pin 138. The ends of the ball guide 140 are received in semi-cylindrical guides 141 (only one shown) which are disposed in a slotted section of the wobble plate 124. With this arrangement the ball guide 140 can rotate and move radially inwardly and outwardly in accordance with the change in angle of the wobble plate 124 within the crankcase.

A valve plate 144 is sandwiched between the cylinder head 102 and cylinder block 101. This plate 144 closes the open ends of the cylinder bores 120 and is formed with a plurality of inlet and outlet ports 146, 148 which are respectively controlled by reed valves 150, 152. The reed valves 150 which control the inlet or induction ports 146 are arranged to be weaker than those which control the discharge ports 148.

The cylinder head 102 is formed with an induction chamber 160 and a discharge chamber 162. These chambers respectively provide fluid communication between a main inlet port 164 formed in the cylinder head and all of the inlet valves and a main discharge port (not shown) also formed in the cylinder head, and all of the discharge valves. The pressure sensor 240 is arranged to communicate with the induction port 164 and to be responsive to the pressure prevailing therein.

A pressure supply passage 165 is formed in the cylinder head which leads from a stepped bore formed to the crankcase chamber C/C. A pressure discharge passage 166 is similarly arranged but opens into a different section of the stepped bore.

The solenoid valve 180 is disposed in the bore. This valve arrangement is formed of first and second housings 181 and 182. First and second valve elements 184 and 186 are disposed in the first housing 181 while a solenoid 188 is disposed in the second housing 182. The first valve element 184 is arranged to control the communication between the discharge chamber 162 and the pressure supply passage 165. This valve element 184 takes the form of a ball valve which is biased to seat against a valve seat by a conical spring 185. The ball valve is adapted to be lifted off the seat by a pushrod section 187 formed on the upper end of the second valve element 186. The second valve element 186 is arranged, as shown, to control the communication between the induction port 164 and the pressure discharge passage 166. This communication is completed by a passage structure schematically illustrated by broken line P.

The second housing 182 including the solenoid 188 is disposed in the open end of the bore and snugly retained in place by a springy type snap ring 189. The second housing 182 is arranged to abut the lower end of the first housing 181 and hold the same securely in place. The solenoid 188 includes a push rod 190 which abuts the lower end of the second valve element 186 and drives the second element to its closed position when energized (energized condition illustrated). When the second valve element 186 is seated on its valve seat, the push rod portion thereof lifts the first valve element 184 off its seat. When the solenoid 188 is deenergized the second valve element 186 is allowed to assume an open position and the first valve element 184 assume a closed one.

By controlling the duty cycle of the signal applied to the solenoid 188, the pressure in the crankcase chamber C/C can be controlled by selectively controlling the amount of communication with the induction and discharge chambers 160, 162. By controlling the pressure in the crankcase C/C the angle of the wobble plate 124 can be controlled. Viz., when the pressure in the crankcase is lowered toward its minimum value (i.e. a value essentially equal to that prevailing in the induction port 164), the pressure differential acting across the piston 122 undergoing its induction stroke becomes essentially zero. Under these conditions the piston is permitted to be drawn through the bore with the minimum resistance. This induces the situation wherein a moment of force is produced which tends to rotate the wobble plate 124 toward its maximum angle of inclination. Accordingly, the stroke of the piston 122 and amount of coolant discharged from the compressor are maximized.

On the other hand, when the pressure in the crankchamber C/C is maximized (viz, raised to essentially that prevailing in the discharge chamber 162) the pressure differential acting across the piston 122 undergoing its induction stroke is maximized. This tends to the situation wherein the resistance to the induction stroke is increased and results in the wobble plate 124 being rotated toward its minimum angle of inclination. Under these conditions the amount of coolant discharged by the compressor tends to be minimized.

Figure 5:
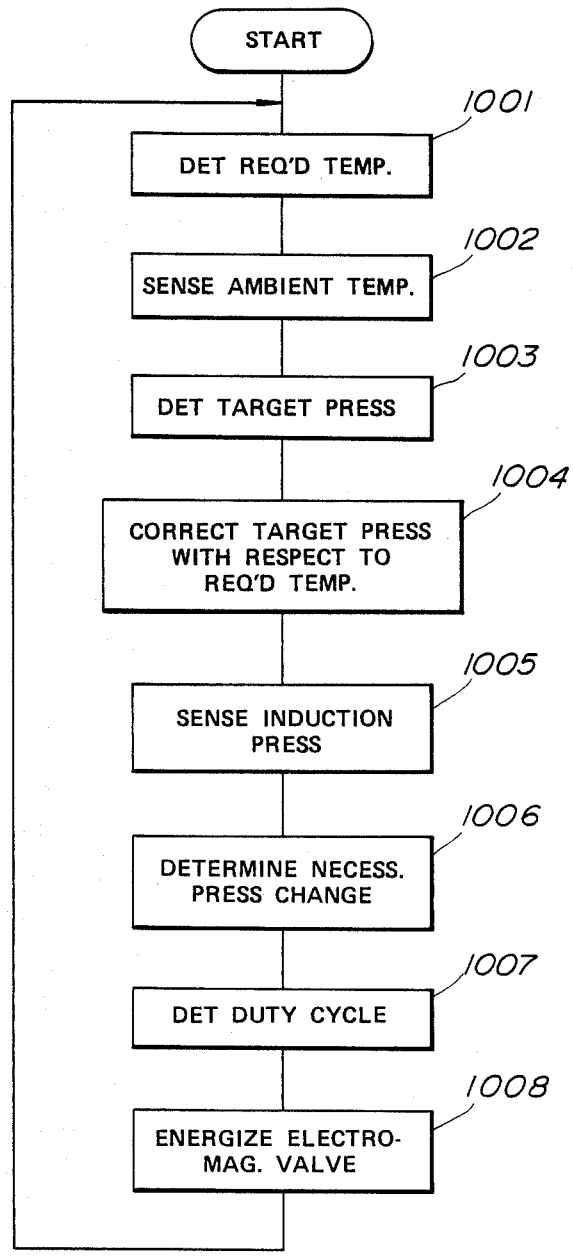
FIG. 5 is a flow chart showing basic steps conducted with the present invention.

In the instant embodiment the microprocessor 200 is used to control the duty cycle of the signal applied to the solenoid valve 180. This device contains a control program in ROM which executes the steps shown in FIG. 5. As shown, in steps 1001 and 1002 the program is arranged to sample (a) the output of a control unit 230 of the air conditioner via which the cabin temperature (viz., required temperature) can be set—for example a variable resistor which is connected to a manually operable knob; and (b) the output of the ambient air temperature sensor 220. This latter mentioned sensor 220 can take the form of a thermistor which is mounted in the shadow of the bumper or the like of the vehicle, so as to be exposed to the external atmosphere (as different from that in the vehicle cabin) and shaded from direction exposure to the sun light. The sampled data is set in RAM ready for processing by a program and associated data set in ROM.

At step 1003 the target pressure (viz., the pressure to which the pressure in the crankcase should be controlled) is calculated. This is done using an algorithm which is set in ROM and which takes the instant ambient temperature and determines the appropriate level to which the pressure in the evaporator (in this instance sensed at the induction port of the compressor) should be controlled.

Figure 3:
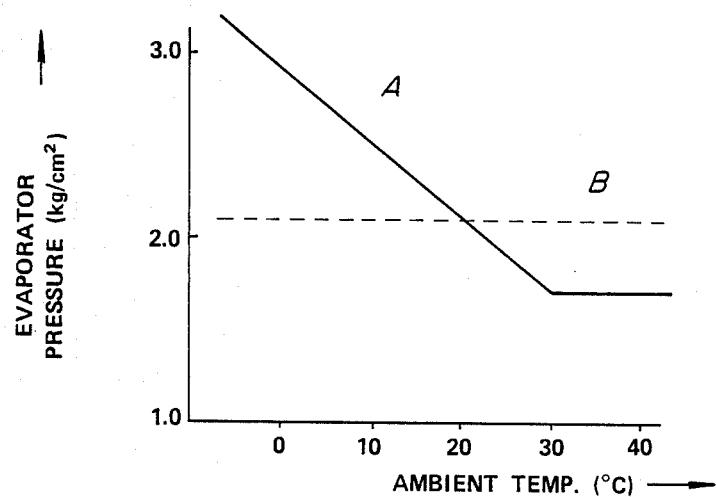
FIG. 3 is a graph showing the relationship between the ambient temperature and the pressure which is required in the evaporator.

Trace A of FIG. 3 shows the relationship between the ambient air temperature and the pressure which is required in to evaporator according the the instant embodiment. By way of example, when the ambient air temperature is about 20° C., the pressure in the evaporator should be about 2.1 Kg/cm$^2$. When the temperature is slightly lower than 0° C. the pressure should be controlled to about 3.0 Kg/° C. As shown, after the temperature of ambient air falls below 30° C. the pressure in the evaporator is varied proportionally with respect to the change in the ambient temperature. This control should be compared with the prior art control charactertistics denoted by trace B in FIG. 3. As will be appreciated, in summer when the cooling demand is high and the ambient temperature is above 20° C. the pressure in the evaporator can be controlled in the range of approximately 1.7 Kg/cm$^2$ to 2.1 Kg/cm$^2$ as different from the fixed control level (e.g. 2.1 Kg/cm$^2$) possible with the prior art.

Figure 4:
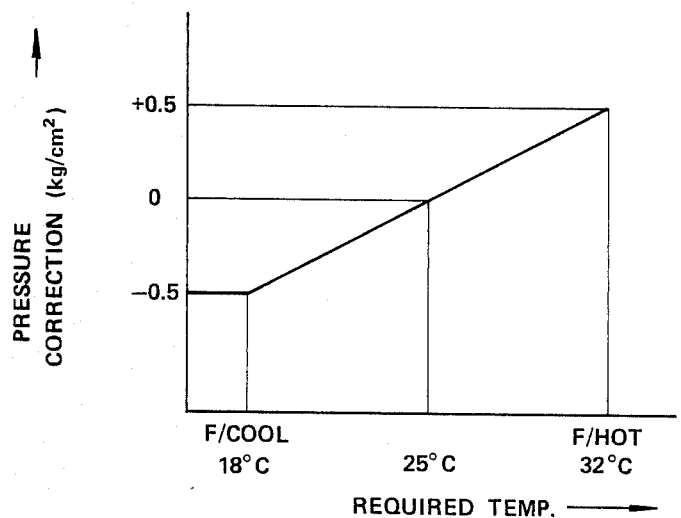
FIG. 4 is a graph showing the amount of pressure correction which should be made to the value derived using the relationship shown in FIG. 3 in view of required or desired evaporator temperature.

According to the present invention, the pressure determined in step 1003 using the above mentioned algorithm, is adjusted with respect to the required evaporator temperature in step 1004, according to the relationship shown in FIG. 4. As shown in this figure, when the temperature control is set to 25° C. the amount of pressure correction is 0 (zero). However, if the temperature control is set to 32° C. (indicating a demand for heating the cabin) the derived pressure value is corrected by adding approximately 0.5 Kg/cm$^2$. To implement this control a suitable algorithm which processes the inputted data in the manner to obtain the relationship illustrated in FIG. 4, is set in ROM. Alternatively, it is possible to record the data in the form of a look-up table if so desired.

At step 1005 the instant output of the pressure sensor 240 is read and the instant value thereof set in RAM.

At step 1006 the instant evaporator pressure is compared with the corrected value derived in step 1004 and the change in pressure required in the crankcase chamber C/C calculated.

At step 1007 a sub-routine is run in order to determine the change in duty cycle required in order to bring the pressure prevailing in the crankcase to that determined in step 1006. At step 1008 a command is issued and applied to the signal generator 210 which produces the required driving signal.

It will be of course understood that the present invention is not limited to application in automotive air conditioning units and may find application in other forms of refrigeration systems or the like wherein control of the amount of fluid discharged by a variable displacement wobble type compressor is required.

For further disclosure relating to the general construction of the above disclosed type of wobble plate compressor reference may be had to the above mentioned United States Patent No. 4,428.718.

What is claimed is:

1. In a refrigeration system an evaporator, said evaporator being arranged to vary the temperature of a fluid in an enclosed space via heat exchange;
   a variable displacement wobble plate compressor, said compressor having a crankcase, said compressor being so constructed and arranged that the displacement of said compressor is controlled by the pressure in said crankcase, said compressor having an induction port in fluid communication with said evaporator;
   a valve for controlling the pressure in said crankcase;
   a sensor arrangement for determining the ambient air temperature and the temperature to which the fluid in said enclosed space is to be controlled;
   a pressure sensor responsive to the pressure prevailing in said evaporator; and
   a control circuit responsive to said sensor arrangement and said pressure sensor for producing a control signal via which said valve is exclusively controlled in a manner to selectively vary the pressure prevailing in said crankcase.

2. A refrigeration system as claimed in claim 1 further comprising:
   first control schedule means, said first control schedule being defined in terms of evaporator pressure and ambient temperature;
   said control circuit using said first control schedule to determine the target pressure to be produced in said evaporator with respect to the ambient temperature; and
   a second control schedule means, said second control schedule being defined in terms of the temperature to which said evaporator is required to be controlled and the amount by which the target pressure should be corrected,
   said control circuit using said second control schedule to correct the target pressure with respect to the temperature to which the evaporator is required to be controlled.

3. A refrigeration system as claimed in claim 1 wherein said sensor arrangement comprises:
   an ambient temperature sensor; and
   a sensor responsive to the setting of a manually operable control element via which the temperature to which the evaporator is required to be controlled, is selected.

4. A refrigeration system as claimed in claim 1 wherein said pressure sensor is disposed in either said evaporator or said induction port of said compressor.

5. A refrigeration system as claimed in claim 1 wherein said compressor further comprises a discharge port and wherein said valve selectively controls the communication between said crankcase and said induction and discharge ports in a manner which varies the pressure prevailing in said crankcase.

6. A refrigeration system as claimed in claim 5 wherein said refrigeration system forms part of an automotive air conditioning unit and wherein said compressor is driven by the engine of said vehicle through a selectively operable clutch.

7. In a method of operating a refrigeration system comprising:
   an evaporator which is arranged to vary the temperature of a fluid in an enclosed space via heat exchange; a variable displacement wobble plate compressor, said compressor having a crankcase, said compressor being so constructed and arranged that the displacement of the compressor is controlled by the pressure in said crankcase, said compressor having an induction port in fluid communication with said evaporator; and a valve for controlling the pressure in said crankcase, the steps of:
   sensing the ambient air temperature and the temperature to which the fluid in said enclosed space is required to be controlled;
   sensing the pressure prevailing in said evaporator and controlling the operation of said valve in accordance with the sensed pressure, the sensed ambient air temperature and the temperature to which the fluid in said enclosed space is to be controlled, said step of controlling including the production of a signal which signal exclusively controls said valve in a manner to selectively vary the pressure in said crankcase.

8. A method as claimed in claim 7 wherein said step of controlling comprises:

utilizing a first control schedule means, said first control schedule being defined in terms of evaporator pressure and ambient temperature;

using said first schedule to determine the target pressure to be produced in said evaporator with respect to the ambient temperature;

utilizing a second control schedule means, said second control schedule being defined in terms of the temperature to which said evaporator is required to be controlled and the amount by which the target pressure should be corrected; and using said second schedule to correct the target pressure with respect to said temperature to which the evaporator is required to be controlled.

* * * * *